United States Patent
Uehara et al.

(10) Patent No.: US 11,434,606 B2
(45) Date of Patent: Sep. 6, 2022

(54) PULP MOLDED PRODUCT AND METHOD FOR MANUFACTURING SAME

(71) Applicant: DAIKIN INDUSTRIES, LTD., Osaka (JP)

(72) Inventors: Tetsuya Uehara, Osaka (JP); Michio Matsuda, Osaka (JP); Takashi Enomoto, Osaka (JP)

(73) Assignee: DAIKEN INDUSTRIES, LTD., Osaka (JP)

( * ) Notice: Subject to any disclaimer, the term of this patent is extended or adjusted under 35 U.S.C. 154(b) by 29 days.

(21) Appl. No.: 16/958,444

(22) PCT Filed: Dec. 6, 2018

(86) PCT No.: PCT/JP2018/044985
§ 371 (c)(1),
(2) Date: Jun. 26, 2020

(87) PCT Pub. No.: WO2019/131048
PCT Pub. Date: Jul. 4, 2019

(65) Prior Publication Data
US 2021/0054569 A1    Feb. 25, 2021

(30) Foreign Application Priority Data

Dec. 28, 2017  (JP) .............................. JP2017-253440

(51) Int. Cl.
| | | |
|---|---|---|
| *D21H 17/29* | (2006.01) | |
| *D21H 21/16* | (2006.01) | |
| *B65D 1/34* | (2006.01) | |
| *C08F 220/22* | (2006.01) | |
| *D21H 17/43* | (2006.01) | |
| *D21H 17/45* | (2006.01) | |
| *D21H 27/10* | (2006.01) | |

(52) U.S. Cl.
CPC ............. *D21H 21/16* (2013.01); *B65D 1/34* (2013.01); *C08F 220/22* (2013.01); *D21H 17/29* (2013.01); *D21H 17/43* (2013.01); *D21H 17/45* (2013.01); *D21H 27/10* (2013.01); *C08F 2810/50* (2013.01)

(58) Field of Classification Search
CPC ........ D21H 21/14; D21H 21/16; D21H 17/43; D21H 17/34; D21H 17/45; D21H 17/29; D21J 3/00; D21J 1/08; C08F 2810/50; C08F 220/22; C08L 1/02; C08L 3/02; C08L 33/16; C08L 101/14; Y02W 90/10
USPC ....................................................... 162/164.2
See application file for complete search history.

(56) References Cited

U.S. PATENT DOCUMENTS

| | | |
|---|---|---|
| 5,849,152 A | 12/1998 | Arnold et al. |
| 9,464,384 B2 | 10/2016 | Uehara et al. |
| 2010/0168319 A1 | 7/2010 | Sugimoto et al. |
| 2015/0096699 A1 | 4/2015 | Uehara et al. |

FOREIGN PATENT DOCUMENTS

| | | |
|---|---|---|
| CN | 1209484 A | 3/1999 |
| CN | 101624794 A | 1/2010 |
| CN | 103711028 A | 4/2014 |
| CN | 104169497 A | 11/2014 |
| JP | 56-96996 A | 8/1981 |
| JP | 9-508422 A | 8/1997 |
| JP | 10-046500 A | 2/1998 |
| JP | 2002-322313 A | 11/2002 |
| JP | 2004-508446 A | 3/2004 |
| JP | 2006-89889 A | 4/2006 |
| JP | 2013-217007 A | 10/2013 |
| JP | 2015-086478 A | 5/2015 |
| WO | 02/20665 A2 | 3/2002 |
| WO | 2009/057716 A1 | 5/2009 |
| WO | 2017/122728 A1 | 7/2017 |

OTHER PUBLICATIONS

International Preliminary Report on Patentability dated Jun. 30, 2020 from the International Bureau in International Application No. PCT/JP2018/044985.
Extended European Search Report dated Oct. 14, 2021 by the European Patent Office in application No. 18897123.8.
International Search Report for PCT/JP2018/044985, dated Mar. 5, 2019.

*Primary Examiner* — Mark Halpern
(74) *Attorney, Agent, or Firm* — Sughrue Mion, PLLC

(57) ABSTRACT

A molded pulp product including: a pulp, a water- and oil-resistant agent, and a water soluble polymer that does not dissolve in an aqueous medium at 40° C. or lower, wherein a content of the water soluble polymer is 1 to 50% by mass, based on the pulp.

9 Claims, 1 Drawing Sheet

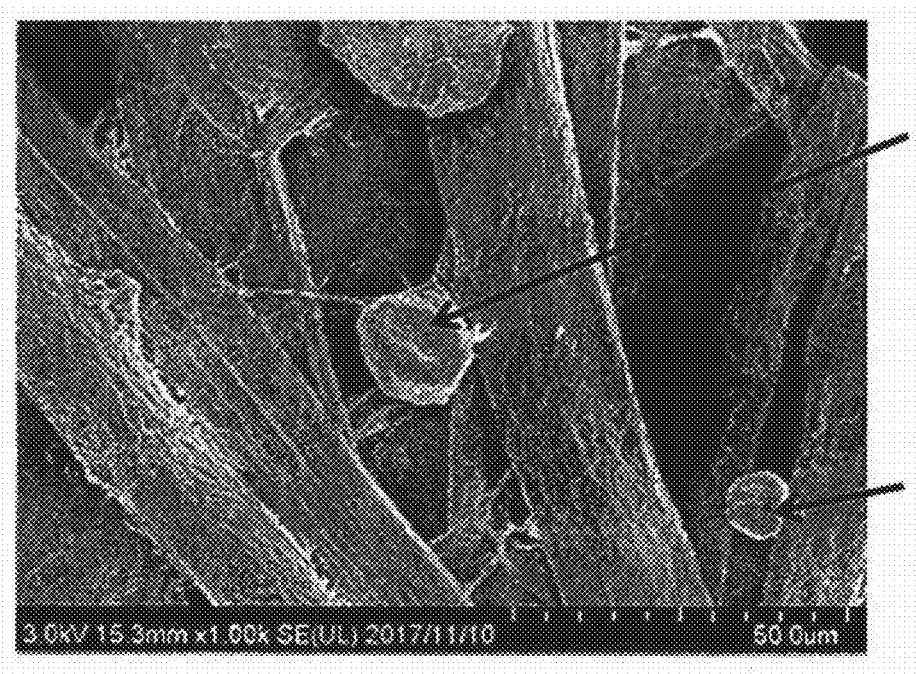

PULP MOLDED PRODUCT AND METHOD FOR MANUFACTURING SAME

CROSS REFERENCE TO RELATED APPLICATIONS

This application is a National Stage of International Application No. PCT/JP2018/044985 filed Dec. 6, 2018, claiming priority based on Japanese Patent Application No. 2017-253440 filed Dec. 28, 2017, the entire content of which is incorporated herein by reference.

TECHNICAL FIELD

The present disclosure relates to a molded pulp product and a manufacturing method therefor.

BACKGROUND ART

Molded pulp products can be manufactured by a pulp molding method in which a slurry containing a pulp dispersed in an aqueous medium (hereinafter, also simply referred to as a "pulp slurry") is used to form a desired shape, and there are increasing demands for molded pulp products because, for example, the main component pulp is biodegradable, and the recycle use of molded pulp products is relatively easy.

To date, plastic containers have been widely used as food containers (including trays and the like), but plastic containers are problematic in that they are not biodegraded when directly discarded into the soil. Accordingly, with environmental considerations, the use of molded pulp products in place of plastic containers is desired.

However, molded pulp products are composed mainly of a pulp, and, therefore, for use as food containers, molded pulp products have disadvantages, for example, poor water resistance, oil resistance, and gas barrier properties. Accordingly, in order to impart water resistance, oil resistance, and gas barrier properties to molded pulp products that are to be used as food containers (hereinafter, also simply referred to as "molded pulp containers"), commonly the container surface is laminated with a plastic film. However, such molded pulp containers are not suitable for recycle use because it is difficult to separate the plastic film from the container body that is mainly composed of a pulp, and are thus problematic in that the plastic film is not biodegraded when the molded pulp containers are directly discarded into the soil without separation.

Under these circumstances, in order to impart water resistance, oil resistance, and gas barrier properties to molded pulp containers, Patent Literature 1 proposes that a water repellant, an oil-resisting agent, and the like are internally added to the raw material liquid (a pulp slurry) of a container, and also a gas barrier paper layer is formed on the container surface. Moreover, in order to impart water resistance, gas barrier properties, and the like, Patent Literature 2 proposes that a cellulose composite that supports organopolymetal oxide is internally added to a pulp slurry to obtain a molded pulp container.

CITATION LIST

Patent Literature

Patent Literature 1: JP H10-46500A
Patent Literature 2: JP 2002-322313A
Patent Literature 3: JP 1997-508422A
Patent Literature 4: JP 2015-86478A

SUMMARY OF INVENTION

Technical Problem

In the molded pulp container described in Patent Literature 1, the gas barrier paper layer formed on the container surface is mainly composed of a polymer compound that may be an acrylic ester or a styrene copolymer. With such a gas barrier paper layer, sufficiently high gas barrier properties cannot necessarily be achieved. Moreover, when the gas barrier paper layer is formed by screening the raw material liquid to form an intermediate and then spraying an aqueous solution of a polymer compound or by adding a solution containing a polymer compound during the course of feeding the raw material liquid into a mold, in order to recycle the used molded pulp mold as raw materials, it is not possible to crush the entirety of the container to bring it back to the starting raw materials, and it is necessary to separate the gas barrier paper layer part and the container body part. Thus, there is still a problem in that the molded pulp container is not suitable for recycle use.

Patent Literature 2 discloses that paper obtained by internally adding a cellulose composite that supports organopolymetal oxide exhibits high gas barrier properties (large air permeance). However, sufficiently high oil resistance cannot necessarily be achieved when the cellulose composite that supports organopolymetal oxide is internally added to a pulp slurry.

Meanwhile, Patent Literature 3 discloses that a molded body is produced by baking a viscous mass containing a fiber material, water, and starch in a baking mold, although it is not related to a molded pulp. This viscous mass is prepared with a small amount of water so as to gelate the starch. Patent Literature 3 is silent on gas barrier properties and water and oil resistance.

In connection with a molded pulp, Patent Literature 4 discloses that a molded pulp container is produced using a slurry of non-wood fibers to which vegetable starch is added. In Patent Literature 4, starch is used to increase the strength of the container. Patent Literature 4 is silent on gas barrier properties.

In view of the problems of conventional art, an object of the present disclosure is to provide a novel molded pulp product having high gas barrier properties and excellent water resistance and oil resistance, and a manufacturing method therefor.

Solution to Problem

The present disclosure provides the following embodiments.

Embodiment 1

A molded pulp product comprising:
a pulp,
a water- and oil-resistant agent, and
a water soluble polymer that does not dissolve in an aqueous medium at 40° C. or lower, wherein a content of the water soluble polymer is 1 to 50% by mass, based on the pulp.

Embodiment 2

The molded pulp product according to Embodiment 1, wherein the water soluble polymer is starch.

Embodiment 3

The molded pulp product according to Embodiment 1 or 2, wherein the water soluble polymer has a cation site.

Embodiment 4

The molded pulp product according to any one of Embodiments 1 to 3, wherein the water soluble polymer comprises a starch powder.

Embodiment 5

The molded pulp product according to any one of Embodiments 1 to 4, wherein a content of the water- and oil-resistant agent is 0.01 to 20% by mass, based on the pulp.

Embodiment 6

The molded pulp product according to any one of Embodiments 1 to 5, wherein the water- and oil-resistant agent comprises a fluorine-containing copolymer comprising repeating units derived from:
(a) a fluorine-containing monomer represented by a general formula:

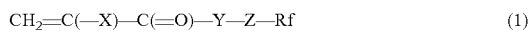

$$CH_2=C(-X)-C(=O)-Y-Z-Rf \quad (1)$$

wherein
X is a hydrogen atom, a monovalent organic group, or a halogen atom,
Y is —O— or —NH—,
Z is a direct bond or a divalent organic group, and
Rf is a fluoroalkyl group having 1 to 20 carbon atoms; and
(b) a monomer having at least one of an anion donating group and a cation donating group.

Embodiment 7

The molded pulp product according to Embodiment 6, wherein in general formula (1), X is a hydrogen atom, a linear or branched alkyl group having 1 to 21 carbon atoms, a fluorine atom, a chlorine atom, a bromine atom, an iodine atom, a $CFX^1X^2$ group (wherein $X^1$ and $X^2$ are each independently a hydrogen atom, a fluorine atom, a chlorine atom, a bromine atom, or an iodine atom), a cyano group, a linear or branched fluoroalkyl group having 1 to 21 carbon atoms, a substituted or unsubstituted benzyl group, or a substituted or unsubstituted phenyl group.

Embodiment 8

The molded pulp product according to Embodiment 6 or 7, wherein in general formula (1), Z is a direct bond, an aliphatic group having 1 to 10 carbon atoms, an aromatic group or cycloaliphatic group having 6 to 18 carbon atoms, a —$CH_2CH_2N(R^1)SO_2$— group (wherein $R^1$ is an alkyl group having 1 to 4 carbon atoms), a —$CH_2CH(OZ^1)CH_2$— group (wherein $Z^1$ is a hydrogen atom or an acetyl group), or a —$(CH_2)_m$—$SO_2$—$(CH_2)_n$— group or —$(CH_2)_m$—S—$(CH_2)_n$— group (wherein m is 1 to 10, and n is 0 to 10).

Embodiment 9

The molded pulp product according to any one of Embodiments 6 to 8, wherein in general formula (1), Rf is a fluoroalkyl group having 1 to 6 carbon atoms.

Embodiment 10

The molded pulp product according to any one of Embodiments 1 to 9, further comprising a cationic coagulant.

Embodiment 11

The molded pulp product according to Embodiment 10, wherein a content of the cationic coagulant is 20% by mass or less, based on the pulp.

Embodiment 12

The molded pulp product according to any one of Embodiments 1 to 11, further comprising a water-resistant agent in addition to the water- and oil-resistant agent.

Embodiment 13

The molded pulp product according to Embodiment 12, wherein a content of the water-resistant agent is 20% by mass or less, based on the pulp.

Embodiment 14

The molded pulp product according to any one of Embodiments 1 to 13, having an air permeance of 500 seconds or more.

Embodiment 15

The molded pulp product according to any one of Embodiments 1 to 14, which is a food container.

Embodiment 16

A method for manufacturing a molded pulp product, the method comprising adding a water- and oil-resistant agent and a water soluble polymer that does not dissolve in an aqueous medium at 40° C. or lower to a slurry comprising a pulp dispersed in the aqueous medium to prepare a pulp-containing aqueous composition, screening the pulp-containing aqueous composition to form a molded pulp intermediate, followed by dewatering and then at least drying to give a molded pulp product, wherein the water soluble polymer remains in a solid state from the preparation to the dewatering.

Embodiment 17

The method for manufacturing a molded pulp product according to Embodiment 16, wherein the water soluble polymer is a starch powder.

Embodiment 18

The method for manufacturing a molded pulp product according to Embodiment 16 or 17, wherein a content of the water soluble polymer based on the aqueous medium in the pulp-containing aqueous composition is 0.001 to 3% by mass.

Embodiment 19

The method for manufacturing a molded pulp product according to any one of Embodiments 16 to 18, wherein a content of the water soluble polymer in the pulp-containing aqueous composition is 0.001 to 2.5% by mass.

Embodiment 20

The method for manufacturing a molded pulp product according to any one of Embodiments 16 to 19, wherein a content of the water- and oil-resistant agent in the pulp-containing aqueous composition is 0.00001 to 1% by mass.

Embodiment 21

The method for manufacturing a molded pulp product according to any one of Embodiments 16 to 20, further comprising adding a cationic coagulant to the slurry to prepare the pulp-containing aqueous composition.

Embodiment 22

The method for manufacturing a molded pulp product according to Embodiment 21, wherein a content of the cationic coagulant in the pulp-containing aqueous composition is 1% by mass or less.

Embodiment 23

The method for manufacturing a molded pulp product according to any one of Embodiments 16 to 22, further comprising adding a water-resistant agent in addition to the water- and oil-resistant agent to the slurry to prepare the pulp-containing aqueous composition.

Embodiment 24

The method for manufacturing a molded pulp product according to Embodiment 23, wherein a content of the water-resistant agent in the pulp-containing aqueous composition is 1% by mass or less.

Embodiment 25

The method for manufacturing a molded pulp product according to any one of Embodiments 16 to 24, wherein the molded pulp product according to any one of Embodiments 1 to 15 is obtained.

Advantageous Effects of Invention

The present disclosure provides a novel molded pulp product having high gas barrier properties and excellent water resistance and oil resistance, and a manufacturing method therefor.

BRIEF DESCRIPTION OF DRAWING

The FIGURE is a scanning electron micrograph (SEM) of a molded pulp product obtained in Example 1.

DESCRIPTION OF EMBODIMENTS

The molded pulp product according to one embodiment of the present disclosure comprises:
a pulp,
a water- and oil-resistant agent, and
a water soluble polymer that does not dissolve in an aqueous medium at 40° C. or lower (herein, also simply referred to as a "water soluble polymer"), wherein a content of the water soluble polymer is 1 to 50% by mass, based on the pulp.

Below, the molded pulp product of the present disclosure will now be described in detail by way of the manufacturing method therefor.

The molded pulp product can be manufactured by the method for manufacturing a molded pulp product of the present disclosure, the method comprising adding a water- and oil-resistant agent and a water soluble polymer that does not dissolve in an aqueous medium at 40° C. or lower to a slurry comprising a pulp dispersed in the aqueous medium to prepare a pulp-containing aqueous composition, screening (papermaking) the pulp-containing aqueous composition to form a molded pulp intermediate, followed by dewatering and then at least drying to give a molded pulp product, wherein the water soluble polymer remains in a solid state from the preparation to the dewatering.

First, a slurry containing a pulp dispersed in an aqueous medium (i.e., a pulp slurry) is provided.

The pulp used as a raw material (a pulp raw material) may be any of bleached or unbleached chemical pulp such as craft pulp or sulfite pulp, bleached or unbleached high yield pulp such as ground wood pulp, mechanical pulp, or thermomechanical pulp, waste paper pulp such as waste newsprint paper, waste magazine paper, waste cardboard paper, or deinked waste paper, and non-wood pulp such as bagasse pulp, kenaf pulp, or bamboo pulp, and may be one of or a combination of two or more of such materials. Also, a mixture of a pulp raw material with one of or two or more of asbestos and synthetic fibers of polyamide, polyimide, polyester, polyolefin, and the like can be used as well.

The aqueous medium is a medium mainly composed of water, and may be substantially consisting of water or may contain a relatively small amount of another liquid medium (for example, an organic solvent such as an alcohol).

The pulp-containing aqueous composition is prepared by adding a water- and oil-resistant agent and a water soluble polymer that does not dissolve in an aqueous medium at 40° C. or lower and, optionally, for example, a cationic coagulant and/or a water-resistant agent to the pulp slurry.

Any suitable material capable of imparting water resistance and oil resistance to the pulp can be used as a water- and oil-resistant agent. The "water- and oil-resistant agent" herein refers to a component that, when added to the pulp slurry, is capable of increasing both the water resistance and the oil resistance of a molded pulp product as compared to the case where it is not added. The "water resistance" means that the molded pulp product is not impregnated with water when the molded pulp product is brought into contact with hot (for example, 50° C. or higher, typically 90° C.) water for a certain period of time (for example, for 10 minutes or longer, typically 30 minutes). The "oil resistance" means that the molded pulp product is not impregnated with oil when the molded pulp product is brought into contact with hot (for example, 50° C. or higher, typically 90° C.) oil for a certain period of time (for example, for 10 minutes or longer, typically 30 minutes).

The water- and oil-resistant agent may be ionic or nonionic. When the pulp is ionic (usually the pulp can exhibit, but is not limited to, anionic properties due to a carboxyl group or the like), the water- and oil-resistant agent is preferably an ionic, more specifically, anionic, cationic, or amphoteric water- and oil-resistant agent so as to be readily anchored to the pulp in the pulp slurry and in the product.

For example, the water- and oil-resistant agent may comprise a fluorine-containing copolymer comprising repeating units derived from:

(a) a fluorine-containing monomer represented by general formula:

$$CH_2=C(-X)-C(=O)-Y-Z-Rf \quad (1)$$

wherein
X is a hydrogen atom, a monovalent organic group, or a halogen atom,
Y is —O— or —NH—,
Z is a direct bond or a divalent organic group, and
Rf is a fluoroalkyl group having 1 to 20 carbon atoms; and
(b) a monomer having at least one of an anion donating group and a cation donating group (hereinafter, also simply referred to as an "ionic monomer").

Not to limit to the present disclosure, in the fluorine-containing copolymer, the repeating unit derived from the fluorine-containing monomer (a) can contribute to exhibiting water resistance and oil resistance, and the repeating unit derived from the ionic monomer (b) can contribute to anchorability to the pulp.

As for the fluorine-containing monomer (a), the α-position (of acrylate or methacrylate) may be substituted with a halogen atom or the like. Accordingly, in the above formula (1), X may be a linear or branched alkyl group having 1 to 21 carbon atoms, a fluorine atom, a chlorine atom, a bromine atom, an iodine atom, a $CFX^1X^2$ group (wherein $X^1$ and $X^2$ are each independently a hydrogen atom, a fluorine atom, a chlorine atom, a bromine atom, or an iodine atom), a cyano group, a linear or branched fluoroalkyl group having 1 to 21 carbon atoms, a substituted or unsubstituted benzyl group, or a substituted or unsubstituted phenyl group.

In the above formula (1), Z, when being a divalent organic group, may be an aliphatic group having 1 to 10 carbon atoms, an aromatic group or cycloaliphatic group having 6 to 10 carbon atoms, a —$CH_2CH_2N(R^1)SO_2$— group (wherein $R^1$ is an alkyl group having 1 to 4 carbon atoms), a —$CH_2CH(OZ^1)CH_2$— group (wherein $Z^1$ is a hydrogen atom or an acetyl group), or a —$(CH_2)_m$—$SO_2$—$(CH_2)_n$— group or —$(CH_2)_m$—S—$(CH_2)_n$— group (wherein m is 1 to 10, and n is 0 to 10).

In the above formula (1), the Rf group is preferably a perfluoroalkyl group. The Rf group may have 1 to 12, for example, 1 to 6, in particular 4 to 6, and especially 6 carbon atoms. From another viewpoint, the Rf group may be a fluoroalkyl group having 1 to 6 carbon atoms (in particular, linear or branched). Examples of the Rf group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$, —$(CF_2)_3CF(CF_3)_2$, —$(CF_2)_4CF(CF_3)_2$, and —$C_8F_{17}$. In particular, —$(CF_2)_5CF_3$ is preferable.

Specific examples of the fluorine-containing monomer (a) include, but are not limited to, the following:

$CH_2=C(-H)-C(=O)-O-(CH_2)_2-Rf$
$CH_2=C(-H)-C(=O)-O-C_6H_4-Rf$
$CH_2=C(-Cl)-C(=O)-O-(CH_2)_2-Rf$
$CH_2=C(-H)-C(=O)-O-(CH_2)_2N(-CH_3)SO_2-Rf$
$CH_2=C(-H)-C(=O)-O-(CH_2)_2N(-C_2H_5)SO_2-Rf$
$CH_2=C(-H)-C(=O)-O-CH_2CH(-OH)CH_2-Rf$
$CH_2=C(-H)-C(=O)-O-CH_2CH(-OCOCH_3)CH_2-Rf$
$CH_2=C(-H)-C(=O)-O-(CH_2)_2-S-Rf$
$CH_2=C(-H)-C(=O)-O-(CH_2)_2-S-(CH_2)_2-Rf$
$CH_2=C(-H)-C(=O)-O-(CH_2)_3-SO_2-Rf$
$CH_2=C(-H)-C(=O)-O-(CH_2)_2-SO_2-(CH_2)_2-Rf$
$CH_2=C(-H)-C(=O)-NH-(CH_2)_2-Rf$
$CH_2=C(-CH_3)-C(=O)-O-(CH_2)_2-Rf$
$CH_2=C(-CH_3)-C(=O)-O-C_6H_4-Rf$
$CH_2=C(-CH_3)-C(=O)-O-(CH_2)_2N(-CH_3)SO_2-Rf$
$CH_2=C(-CH_3)-C(=O)-O-(CH_2)_2N(-C_2H_5)SO_2-Rf$
$CH_2=C(-CH_3)-C(=O)-O-CH_2CH(-OH)CH_2-Rf$
$CH_2=C(-CH_3)-C(=O)-O-CH_2CH(-OCOCH_3)CH_2-Rf$
$CH_2=C(-CH_3)-C(=O)-O-(CH_2)_2-S-Rf$
$CH_2=C(-CH_3)-C(=O)-O-(CH_2)_2-S-(CH_2)_2-Rf$
$CH_2=C(-CH_3)-C(=O)-O-(CH_2)_3-SO_2-Rf$
$CH_2=C(-CH_3)-C(=O)-O-(CH_2)_2-SO_2-(CH_2)_2-Rf$
$CH_2=C(-CH_3)-C(=O)-NH-(CH_2)_2-Rf$
$CH_2=C(-F)-C(=O)-O-(CH_2)_2-S-Rf$
$CH_2=C(-F)-C(=O)-O-(CH_2)_2-S-(CH_2)_2-Rf$
$CH_2=C(-F)-C(=O)-O-(CH_2)_2-SO_2-Rf$
$CH_2=C(-F)-C(=O)-O-(CH_2)_2-SO_2-(CH_2)_2-Rf$
$CH_2=C(-F)-C(=O)-NH-(CH_2)_2-Rf$
$CH_2=C(-Cl)-C(=O)-O-(CH_2)_2-S-Rf$
$CH_2=C(-Cl)-C(=O)-O-(CH_2)_2-S-(CH_2)_2-Rf$
$CH_2=C(-Cl)-C(=O)-O-(CH_2)_2-SO_2-Rf$
$CH_2=C(-Cl)-C(=O)-O-(CH_2)_2-SO_2-(CH_2)_2-Rf$
$CH_2=C(-Cl)-C(=O)-NH-(CH_2)_2-Rf$
$CH_2=C(-CF_3)-C(=O)-O-(CH_2)_2-S-Rf$
$CH_2=C(-CF_3)-C(=O)-O-(CH_2)_2-S-(CH_2)_2-Rf$
$CH_2=C(-CF_3)-C(=O)-O-(CH_2)_2-SO_2-Rf$
$CH_2=C(-CF_3)-C(=O)-O-(CH_2)_2-SO_2-(CH_2)_2-R$
$CH_2=C(-CF_3)-C(=O)-NH-(CH_2)_2-Rf$
$CH_2=C(-CF_2H)-C(=O)-O-(CH_2)_2-S-Rf$
$CH_2=C(-CF_2H)-C(=O)-O-(CH_2)_2-S-(CH_2)_2-Rf$
$CH_2=C(-CF_2H)-C(=O)-O-(CH_2)_2-SO_2-Rf$
$CH_2=C(-CF_2H)-C(=O)-O-(CH_2)_2-SO_2-(CH_2)_2-Rf$
$CH_2=C(-CF_2H)-C(=O)-NH-(CH_2)_2-Rf$
$CH_2=C(-CN)-C(=O)-O-(CH_2)_2-S-Rf$
$CH_2=C(-CN)-C(=O)-O-(CH_2)_2-S-(CH_2)_2-Rf$
$CH_2=C(-CN)-C(=O)-O-(CH_2)_2-SO_2-Rf$
$CH_2=C(-CN)-C(=O)-O-(CH_2)_2-SO_2-(CH_2)_2-Rf$
$CH_2=C(-CN)-C(=O)-NH-(CH_2)_2-Rf$
$CH_2=C(-CF_2CF_3)-C(=O)-O-(CH_2)_2-S-Rf$
$CH_2=C(-CF_2CF_3)-C(=O)-O-(CH_2)_2-S-(CH_2)_2-Rf$

CH$_2$=C(—CF$_2$CF$_3$)—C(=O)—O—(CH$_2$)$_2$—SO$_2$—Rf
CH$_2$=C(—CF$_2$CF$_3$)—C(=O)—O—(CH$_2$)$_2$—SO$_2$—(CH$_2$)$_2$—Rf
CH$_2$=C(—CF$_2$CF$_3$)—C(=O)—NH—(CH$_2$)$_2$—Rf
CH$_2$=C(—F)—C(=O)—O—(CH$_2$)$_3$—S—Rf
CH$_2$=C(—F)—C(=O)—O—(CH$_2$)$_3$—S—(CH$_2$)$_2$—Rf
CH$_2$=C(—F)—C(=O)—O—(CH$_2$)$_3$—SO$_2$—Rf
CH$_2$=C(—F)—C(=O)—O—(CH$_2$)$_3$—SO$_2$—(CH$_2$)$_2$—Rf
CH$_2$=C(—F)—C(=O)—NH—(CH$_2$)$_3$—Rf
CH$_2$=C(—Cl)—C(=O)—O—(CH$_2$)$_3$—S—Rf
CH$_2$=C(—Cl)—C(=O)—O—(CH$_2$)$_3$—S—(CH$_2$)$_2$—Rf
CH$_2$=C(—Cl)—C(=O)—O—(CH$_2$)$_3$—SO$_2$—Rf
CH$_2$=C(—Cl)—C(=O)—O—(CH$_2$)$_3$—SO$_2$—(CH$_2$)$_2$—Rf
CH$_2$=C(—CF$_3$)—C(=O)—O—(CH$_2$)$_3$—S—Rf
CH$_2$=C(—CF$_3$)—C(=O)—O—(CH$_2$)$_3$—S—(CH$_2$)$_2$—Rf
CH$_2$=C(—CF$_3$)—C(=O)—O—(CH$_2$)$_3$—SO$_2$—Rf
CH$_2$=C(—CF$_3$)—C(=O)—O—(CH$_2$)$_3$—SO$_2$—(CH$_2$)$_2$—Rf
CH$_2$=C(—CF$_2$H)—C(=O)—O—(CH$_2$)$_3$—S—Rf
CH$_2$=C(—CF$_2$H)—C(=O)—O—(CH$_2$)$_3$—S—(CH$_2$)$_2$—Rf
CH$_2$=C(—CF$_2$H)—C(=O)—O—(CH$_2$)$_3$—SO$_2$—Rf
CH$_2$=C(—CF$_2$H)—C(=O)—O—(CH$_2$)$_3$—SO$_2$—(CH$_2$)$_2$—Rf
CH$_2$=C(—CN)—C(=O)—O—(CH$_2$)$_3$—S—Rf
CH$_2$=C(—CN)—C(=O)—O—(CH$_2$)$_3$—S—(CH$_2$)$_2$—Rf
CH$_2$=C(—CN)—C(=O)—O—(CH$_2$)$_3$—SO$_2$—Rf
CH$_2$=C(—CN)—C(=O)—O—(CH$_2$)$_3$—SO$_2$—(CH$_2$)$_2$—Rf
CH$_2$=C(—CF$_2$CF$_3$)—C(=O)—O—(CH$_2$)$_3$—S—Rf
CH$_2$=C(—CF$_2$CF$_3$)—C(=O)—O—(CH$_2$)$_3$—S—(CH$_2$)$_2$—Rf
CH$_2$=C(—CF$_2$CF$_3$)—C(=O)—O—(CH$_2$)$_3$—SO$_2$—Rf
CH$_2$=C(—CF$_2$CF$_3$)—C(=O)—O—(CH$_2$)$_2$—SO$_2$—(CH$_2$)$_2$—Rf wherein Rf is a fluoroalkyl group having 1 to 6, preferably 4 to 6 carbon atoms.

The fluoroalkyl group (the Rf group) in the fluorine-containing monomer (a) is preferably a perfluoroalkyl group, and may be particularly preferably a perfluoroalkyl group having 4 to 6 carbon atoms.

The fluorine-containing monomer may be a mixture of two or more.

The ionic monomer (b) may be a monomer that has at least one of an anion donating group and a cation donating group, and that is copolymerizable with the fluorine-containing monomer (a). The ionic monomer (b) can include (b1) a monomer having an anion donating group and (b2) a monomer having a cation donating group.

The monomer having an anion donating group (b1) may be a compound having an anion donating group and a carbon-carbon double bond. The anion donating group may be a carboxyl group or a sulfonic acid group. The monomer having an anion donating group (b1) may be preferably at least one selected from the group consisting of (meth)acrylic acid, crotonic acid, maleic acid, fumaric acid, itaconic acid, citraconic acid, vinylsulfonic acid, (meth)allylsulfonic acid, styrenesulfonic acid, vinylbenzenesulfonic acid, acrylamide tertiary-butyl sulfonic acid, and salts thereof. The monomer having an anion donating group (b1) is particularly preferably (meth)acrylic acid.

The monomer having a cation donating group (b2) may be, for example, at least one of the amino monomers represented by general formulae:

[Formula 1]

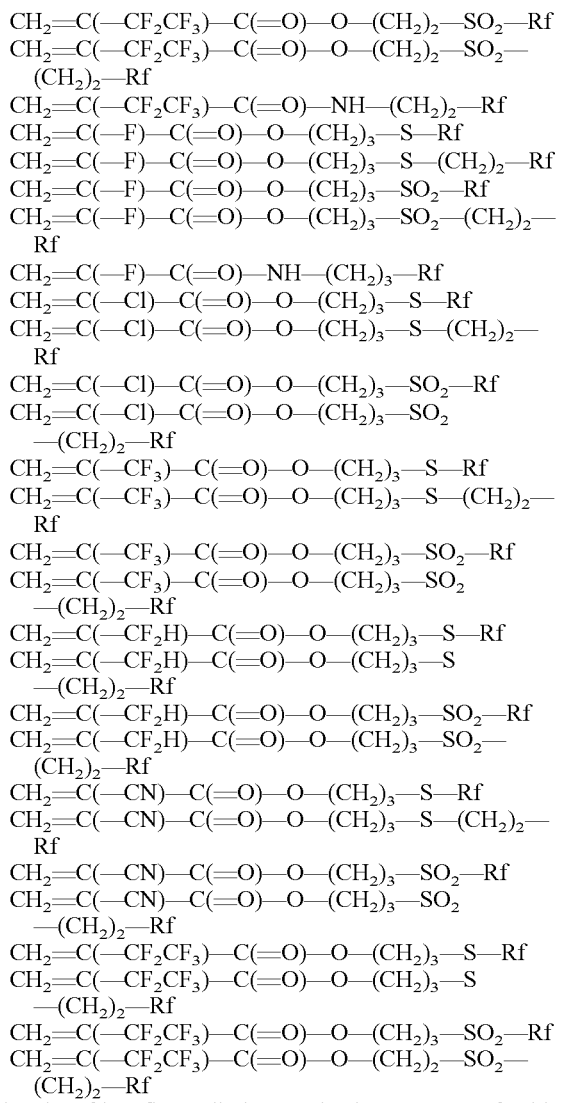

wherein
B represents a linear or branched alkylene group containing 1 to 4 carbon atoms;
$R^{21}$ represents a hydrogen atom or an alkyl group containing 1 to 4 carbon atoms;
$R^{22}$, $R^{23}$, and $R^{24}$ are the same or different and are each independently a hydrogen atom, a linear or branched alkyl group containing 1 to 18 carbon atoms, a hydroxyethyl group, or a benzyl group, or $R^{22}$ and $R^{23}$ together represent a divalent organic group containing 2 to 30 carbon atoms; and
$A^-$ represents an anionic group.

The amino monomer is a compound having at least one nitrogen atom (in particular, an amino group) and one carbon-carbon double bond. The amino monomer is a compound represented by general formula (b2-1) wherein the nitrogen atom is not cationized, a compound represented by general formula (b2-2) wherein the nitrogen atom is cationized, or N-oxide represented by general formula (b2-3). The amino monomer of formula (b2-1) is (meth)acrylate having an amino group (and having neither a cationic group nor an N-oxide group). The amino monomer of formula (b2-2) is (meth)acrylate having a cationic group. The amino monomer of formula (b2-3) is (meth)acrylate having an N-oxide group. The amino monomers represented by general formulae (b2-1) to (b2-3) can be understood as having a cation donating group.

In formula (b2-1), $R^{22}$ and $R^{23}$ may be each independently an alkyl group, or $R^{22}$ and $R^{23}$ may together form a divalent organic group (for example, a cycloalkylamine group). The alkyl group is preferably a methyl group or an ethyl group.

A quaternary ammonium base may be present as a cationic group. That is to say, in formula (b2-2), $R^{22}$, $R^{23}$, and $R^{24}$ may each independently be an alkyl group; or $R^{22}$ and $R^{23}$ may together form a divalent organic group (for example, a cycloalkylamine group), and $R^{24}$ may be an alkyl group. The alkyl group is preferably a methyl group or an ethyl group.

In formulae (b2-1) to (b2-3), when $R^{22}$ and $R^{23}$ together form a divalent organic group, the divalent organic group is preferably a polymethylene group having 2 or more carbon atoms, a group obtained by replacing at least one hydrogen atom of the polymethylene group, or a group obtained by interposing an etheric oxygen atom in the carbon-carbon bond of the polymethylene group. The substituent for replacing the hydrogen atom of the polymethylene group is preferably an alkyl group such as a methyl group, an ethyl group, or a n-propyl group. $R^{22}$ and $R^{23}$ together with the nitrogen atom to which they are attached may form a morpholino, piperidino, or 1-pyrrolidinyl group.

The $A^-$ group is a counter ion (an anion group). The A group may be a halogen atom or a group that remains after removing one cationic hydrogen atom from an acid (an inorganic or organic acid). Examples of the $A^-$ group include a chlorine ion ($Cl^-$), a bromine ion ($Br^-$), an iodine ion ($I^-$), a hydrogen sulfate ion ($HSO_4^-$), and an acetate ion ($CH_3COO^-$).

Examples of the amino monomer (in particular, the amino monomer of formula (b2-1)) include dimethylaminoethyl methacrylate, dimethylaminopropyl methacrylate, diethylaminoethyl methacrylate, diethylaminopropyl methacrylate, N-tert-butylaminoethyl methacrylate, dimethylaminoethyl acrylate, dimethylaminopropyl acrylate, diethylaminoethyl acrylate, diethylaminopropyl acrylate, and N-tert-butylaminoethyl acrylate.

One kind or two or more kinds of repeating units may be derived from the amino monomer. When there are two or more kinds of repeating units, the two or more repeating units preferably have different alkyl group portions or different counter ions.

The amino monomer when contained provides the effect of imparting high water resistance and oil resistance to the molded pulp product even when drying is performed at low temperature for a short period of time after treatment on a processing agent, and increasing the stability of the processing agent.

Examples of the repeating unit that has no cationic group and that is derived from the amino monomer include the following.

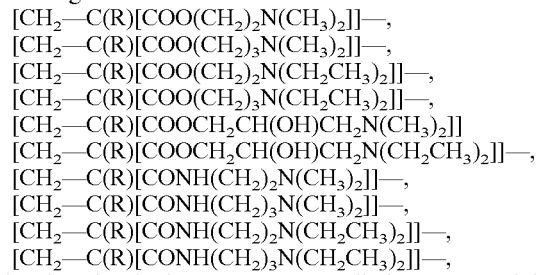

wherein R is a hydrogen atom or an alkyl group containing 1 to 4 carbon atoms.

Specific examples of the polymerization unit that has a cationic group and that is derived from the amino monomer include the following.

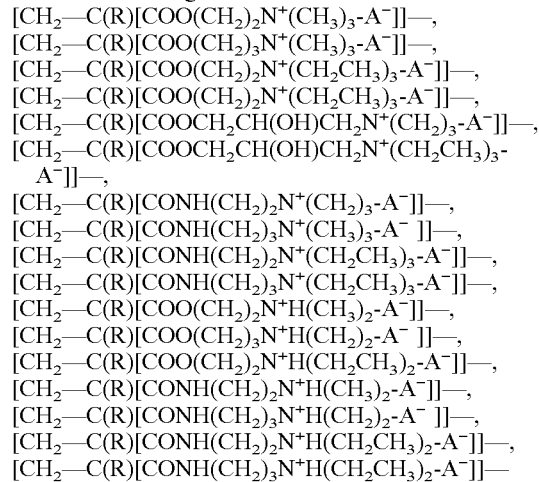

wherein R is a hydrogen atom or an alkyl group containing 1 to 4 carbon atoms; and $A^-$ is an anionic group.

The repeating unit having an ammonium salt (b2-2) can be produced by reacting the repeating unit having an amino group (b2-1) with an acid. Examples of the acid include inorganic acids (for example, hydrogen halides (e.g., hydrochloric acid, hydrogen bromide, and hydrogen iodide), sulfuric acid, and nitric acid) and organic acids (for example, formic acid and acetic acid). The lower limit of the amount of the acid added based on 1 equivalent of the amino group in the repeating unit having an amino group (b2-1) is 10 eq %, for example, 20 eq %, in particular 50 eq %, and the upper limit is 200 eq %, for example, 100 eq %, in particular 80 eq %.

The repeating unit having an N-oxide group (b2-3) can be produced by oxidizing the repeating unit having an amino group (b2-1) with an oxidizing agent. Examples of the oxidizing agent include hydrogen peroxide, persulfuric acid, and percarboxylic acids such as m-chloroperbenzoic acid. The lower limit of the amount of the oxidizing agent added based on 1 equivalent of the amino group in the repeating unit having an amino group (b2-1) is 5 eq %, for example, 10 eq %, and the upper limit is 100 eq %, for example, 50 eq %.

The amino group of the repeating unit derived from the amino monomer is preferably modified to an ammonium salt (cationization) or an N-oxide group (oxidation).

The repeating unit derived from the amino monomer preferably comprises any of:
  (i) an ammonium salt,
  (ii) an N-oxide, and
  (iii) a combination of an ammonium salt and an N-oxide.

In the repeating unit of the monomer having a cation donating group (b2), the molar ratio of the salt (i), the oxide (ii), and the combination (iii) may be at least 5 mol %, for example, at least 20 mol %, in particular at least 50 mol % of the entirety of the repeating unit of the monomer having a cation donating group (b2). The upper limit of mol % of the salt (i), the oxide (ii), and the combination (iii) may be 100 mol %, for example, 80 mol %, specifically 60 mol %.

In the combination (iii), the molar ratio of the ammonium salt to the N-oxide may be 1:99 to 99:1, for example, 1:9 to 9:1.

The ionic monomer (b) may include those corresponding to both the monomer having an anion donating group (b1) and the monomer having a cation donating group (b2), i.e., those having both an anion donating group and a cation donating group.

The fluorine-containing copolymer may further contain, in addition to the repeating units derived from the fluorine-containing monomer (a) and the ionic monomer (b), repeating units derived from one or two or more further monomers that are copolymerizable with the aforementioned monomers.

Examples of the further monomers include (c) a (meth)acrylate monomer that does not contain a fluorine atom (hereinafter, also simply referred to as a "fluorine-free (meth)acrylate monomer"). As used herein, the term "(meth) acrylate" is used to mean the concept encompassing "acrylate" and "methacrylate" and, specifically, may refer to one or both of these. Other terms having the prefix "(meth)" as used herein should be understood accordingly.

The fluorine-free monomer (c) may be an acrylate represented by general formula:

$$CH_2=CA^1COOA^2 \qquad (2)$$

wherein

A¹ is a hydrogen atom, a methyl group, or a halogen atom other than a fluorine atom (for example, a chlorine atom, a bromine atom, or an iodine atom); and A² is a monovalent organic group.

Examples of A² may be an oxyalkylene group (having, for example, 1 to 300 carbon atoms), an alkyl group (having 1 to 30 carbon atoms), and, in addition, a monovalent organic group having an ester group or a urethane group (for example, $-(CH_2)_q COOR^{33}$ or $-(CH_2)_q OCONHR^{34}$ wherein $R^{31}$, $R^{32}$, and $R^{34}$ are the same or different and are each independently a hydrogen atom or an alkyl group (having 1 to 30 (for example, 1 to 4) carbon atoms), $R^{33}$ is an alkyl group (having 1 to 30 (for example, 1 to 4) carbon atoms), and q is 0 to 30, for example, 1 to 20, in particular 2 to 20). The A² group may have at least one (for example, 1 to 10) hydroxyl group.

The fluorine-free monomer (c) may be at least one selected from the group consisting of oxyalkylene (meth)acrylate or oxyalkylene di(meth)acrylate, trimethylolpropane di(meth)acrylate, pentaerythritol tri(meth)acrylate, methyl (meth)acrylate, n-butyl (meth)acrylate, t-butyl (meth)acrylate, 2-ethylhexyl (meth)acrylate, lauryl (meth)acrylate, stearyl (meth)acrylate, and behenyl (meth)acrylate.

Oxyalkylene (meth)acrylate and oxyalkylene di(meth)acrylate may be compounds respectively represented by general formulae:

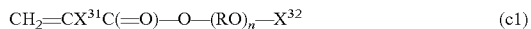

(c1)

and

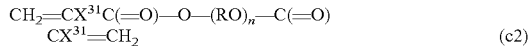

(c2)

wherein $X^{31}$ is a hydrogen atom or a methyl group, $X^{32}$ is a hydrogen atom or an unsaturated or saturated hydrocarbon group having 1 to 22 carbon atoms, R is an alkylene group having 2 to 6 carbon atoms, and n is an integer of 1 to 90.

Oxyalkylene (meth)acrylate represented by general formula (c1) wherein $X^{32}$ is a hydrogen atom, R is a saturated hydrocarbon group having 2 carbon atoms, and n is 10 or less on average may be preferable, and one of or a mixture of 2-hydroxyethyl methacrylate and ω-hydroxy-polyoxyethylene acrylate (the average polymerization degree n of the polyoxyethylene group=3 to 10) may be particularly preferable. An example of ω-hydroxy-polyoxyethylene acrylate may be Blemmer(R) AE-200 (n=4.5) manufactured by NOF Corporation.

The further monomers include (d) a vinyl pyrrolidone monomer represented by general formula:

[Formula 2]

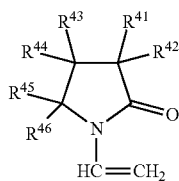

(3)

wherein $R^{41}$, $R^{42}$, $R^{43}$, $R^{44}$, $R^{45}$, and $R^{46}$ are the same or different and each independently represent a hydrogen atom or an alkyl group having 1 to 4 carbon atoms.

The vinylpyrrolidone monomer (d) is an N-vinyl-2-pyrrolidone compound that may have an alkyl substituent having 1 to 4 carbon atoms, preferably a methyl group, on the ring. The number of alkyl substituents on the ring is 0 to 6. The vinylpyrrolidone monomer is preferably at least one selected from the group consisting of N-vinyl-2-pyrrolidone, N-vinyl-3-methyl-2-pyrrolidone, N-vinyl-4-methyl-2-pyrrolidone, N-vinyl-5-methyl-2-pyrrolidone, and N-vinyl-3,3-dimethyl-2-pyrrolidone.

The monomers (a), (b), (c), and (d) may be each independently a simple substance or a mixture of two or more.

In the fluorine-containing copolymer, based on 100 parts by mass of the monomer (a), the amount of the monomer (b) may be 1 to 80 parts by mass, for example, 1 to 40 parts by mass, the amount of the monomer (c) may be 0 to 300 parts by mass, for example, 0 to 100 parts by mass (if present, for example, 1 part by mass or more, in particular 5 parts by mass or more), and the amount of the monomer (d) may be 0 to 80 parts by mass, for example, 0 to 40 parts by mass (if present, for example, 1 part by mass or more).

As an example of the mass ratio, the monomers (a):(b):(c):(d) may be 50 to 85:1 to 15:0 to 50:0 to 25, for example, 60 to 80:2 to 15:0 to 10 (if present, 1 to 10):0 to 20 (if present, 1 to 20) based on the total of the monomers (a) to (d) being 100 parts by mass.

In the present disclosure, the molecular weight of the fluorine-containing copolymer is not limited. In view of water-resisting and oil-resisting properties, the viscosity of the water- and oil-resistant agent, and the like, the weight average molecular weight determined by gel permeation chromatography in terms of polystyrene is usually 3,000 or more, preferably in the range of 5,000 to 1,000,000.

The fluorine-containing copolymer in the present disclosure can be produced by any ordinary polymerization method, and the conditions of the polymerization reaction can be suitably selected as well. Examples of such polymerization methods include solution polymerization, suspension polymerization, and emulsion polymerization.

The water- and oil-resistant agent used as a raw material may contain a further component in addition to the fluorine-containing copolymer. The water- and oil-resistant agent used as a raw material may be in the form of a dispersion containing the fluorine-containing copolymer dispersed in a liquid medium. The liquid medium can be an aqueous medium and, in particular, water, and may contain another component such as polypropylene glycol and/or a derivative thereof. In the case of a dispersion form, the fluorine-containing copolymer is a water dispersion type of being dispersed in an aqueous medium, and the polymer may be self-emulsified, dispersed in the aqueous medium in the form of a neutralized salt, or emulsified with an emulsifier.

Those disclosed in, for example, JP 2013-217007A, JP 2013-503267A, JP 2013-519797A and WO2011/021619 A1, the entire disclosures of which are incorporated herein by reference, are usable as such water- and oil-resistant agents.

Examples of the water soluble polymer that does not dissolve in an aqueous medium at 40° C. or lower include starch and other water soluble polymers that do not dissolve in an aqueous medium at 40° C. or lower.

Starch is not limited as long as it does not dissolve in an aqueous medium at 40° C. or lower, and examples include vegetable starch such as rice starch, wheat starch, corn starch, potato starch, tapioca starch, sweet-potato starch, red bean starch, green gram starch, kudzu starch, and dogtooth-violet starch. The dissolution temperature of starch in water depends on the type of starch, and is, for example, about 55 to 90° C. The dissolution temperature was determined by visual observation under atmospheric pressure in the following manner: 5 parts by mass of a substance was added while being stirred to 100 parts by mass of water maintained at the target temperatures (the liquid might appear cloudy initially after addition), then whether the appearance of the liquid changes from being cloudy to being transparent was observed while retaining the liquid at those temperatures for 30 minutes with continuous stirring, and the highest temperature at which the liquid changed to being transparent was regarded as the dissolution temperature.

Starch used as a raw material has a powdery form. The starch powder is not limited, and may have a particle size distribution of, for example, 0.1 to 100 μm and in particular 1 to 50 μm. The particle size distribution can be measured by image analysis using a scanning electron microscope (SEM).

As other water soluble polymers, for example, locust bean gum, water-insoluble carboxymethyl cellulose, and polyvinyl alcohol that does not dissolve in an aqueous medium at 40° C. or lower are usable. The dissolution temperature of locust bean gum in water may usually be about 50 to 90° C.

Such other water soluble polymers used as raw materials may have a powdery, granular, fibrous, flaky, or a like form.

The water soluble polymer may be ionic or nonionic. When the pulp is ionic, the water soluble polymer is preferably an ionic, and more specifically anionic, cationic, or amphoteric water soluble polymer so as to be readily anchored to the pulp in a pulp slurry and in a product. In particular, when the pulp is ionic, a water soluble polymer with a portion having an ionicity that is opposite the ionicity of the pulp is preferably used, and, accordingly, the water soluble polymer (preferably together with the water- and oil-resistant agent) can be effectively anchored to the pulp, and the gas barrier properties of the eventually obtained molded pulp container can be increased. The pulp is usually anionic, and, for such a pulp, the water soluble polymer preferably has a cationic site and, more specifically, is cationic or amphoteric.

Examples of the water soluble polymer having a cationic site include cationized starch, amphoteric starch, and cation-modified polyvinyl alcohol.

A relatively small polymer or an inorganic substance having cationic properties can be used as a cationic coagulant (except for the above-described water- and oil-resistant agent and water soluble polymer that does not dissolve in an aqueous medium at 40° C. or lower). The cationic coagulant enables the starch and/or the water- and oil-resistant agent to be effectively anchored to the pulp that can be usually anionic, and the gas barrier properties and/or the water-resisting and oil-resisting properties of the eventually obtained molded pulp container to be increased.

What is used as a cationic paper strengthening agent or the like in ordinary papermaking can be used as a cationic coagulant. Examples of the cationic coagulant include a polyamine epichlorohydrin resin, a polyamide epichlorohydrin resin, cationic polyacrylamide (an acrylamide-allylamine copolymer, an acrylamide-dimethylaminoethyl (meth)acrylate copolymer, an acrylamide-diethylaminoethyl (meth)acrylate copolymer, an acrylamide-quaternized dimethylaminoethyl (meth)acrylate copolymer, an acrylamide-quaternized diethylaminoethyl (meth)acrylate copolymer, or the like), polydiallyldimethylammonium chloride, polyallylamine, polyvinylamine, polyethyleneimine, an N-vinylformamide-vinylamine copolymer, a melamine resin, a polyamide epoxy resin, sulfate band, PAC, aluminum chloride, and ferric chloride. In particular, polyamidepolyamine-epichlorohydrin (PAE), polydiallyldimethylammonium chloride (poly-DADMAC), polyacrylamide (PAM), and the like are usable.

A water-resistant agent may be used in addition to the water- and oil-resistant agent. The "water-resistant agent" herein refers to a component that, when added to the pulp slurry, is capable of increasing the water resistance of a molded pulp product as compared to the case where it is not added (provided that the above-described water- and oil-resistant agent is excluded). Due to the water-resistant agent, the water resistance of the eventually obtained molded pulp container can be increased. The above-described cationic coagulant is generally incapable of increasing water resistance by itself, and can be understood as being different from the water-resisting agent.

What is used as a sizing agent or the like in ordinary papermaking is usable as a water-resistant agent. Examples of the water-resistant agent include a cationic sizing agent, an anionic sizing agent, and a rosin-based sizing agent (for example, an acidic rosin-based sizing agent or a neutral rosin-based sizing agent), and a cationic sizing agent is preferable. In particular, a styrene-containing polymer such as a styrene-(meth)acrylate copolymer, an alkenyl succinic anhydride, and an alkyl ketene dimer are preferable.

Furthermore, yield improvers, dyes, fluorescent dyes, fillers, pigments, slime control agents, antislip agents, antifoaming agents, and the like that are usually used as papermaking chemicals in paper treatment agents may be used as necessary.

The pulp-containing aqueous composition is prepared such that the water soluble polymer remains in a solid state. For example, the pulp-containing aqueous composition is prepared at a temperature lower than the dissolution temperature of the water soluble polymer, for example, a temperature at least 5° C. lower. In the prepared pulp-containing aqueous composition, the water soluble polymer remains in a solid state (powdery, granular, fibrous, flaky, or the like depending on the water soluble polymer used as a raw material), and, for example, when starch powder is used as a raw material, the starch powder may be dispersed in an aqueous medium.

The water- and oil-resistant agent and the water soluble polymer and, optionally, for example, the cationic coagulant and/or the water-resistant agent may be added to the pulp slurry in any order as long as the water soluble polymer remains in a solid state.

The content of each component in the pulp-containing aqueous composition (based on all components) can be suitably selected so as to attain a high freeness suitable for screening and dewatering and the physical properties desired of a molded pulp product, and, for example, can be as follows:

Aqueous medium 89.5 to 99.89% by mass, in particular 94.5 to 99.69% by mass

Pulp 0.1 to 5% by mass, in particular 0.3 to 2.5% by mass

Water soluble polymer 0.001 to 2.5% by mass, in particular 0.005 to 1% by mass

Water- and oil-resistant agent 0.00001 to 1% by mass, in particular 0.0001 to 0.5% by mass Cationic coagulant 0 to 1% by mass, in particular 0 to 0.5% by mass (when added, for example, 0.00005% by mass or more)

Water-resistant agent 0 to 1% by mass, in particular 0 to 0.5% by mass (when added, for example, 0.00005% by mass or more)

When each component is in the form of, for example, a dispersion, the above content indicates the solid content (based on all components) of each component in the pulp-containing aqueous composition.

From another viewpoint, the content of each of the pulp and the water soluble polymer based on the aqueous medium in the pulp-containing aqueous composition can be suitably selected so as to attain a high freeness suitable for screening and dewatering, and, for example, can be as follows:

Pulp 0.1 to 5.58% by mass, in particular 0.3 to 2.64% by mass

Water soluble polymer 0.001 to 2.79% by mass, in particular 0.005 to 1.05% by mass When the water soluble polymer is dissolved in the aqueous medium (or when an aqueous solution in which the water soluble polymer such as starch is dissolved in advance in the aqueous medium is added to a pulp slurry), the resulting aqueous composition has a reduced freeness. On the other hand, in the pulp-containing aqueous composition, the water soluble polymer remains in a solid state without being dissolved in the aqueous medium, and, therefore, as compared to the case where the water soluble polymer is dissolved in the aqueous medium, a larger amount of the water soluble polymer can be added while maintaining the high freeness of the pulp-containing aqueous composition.

Next, the pulp-containing aqueous composition prepared above is screened to form a molded pulp intermediate, and the molded pulp intermediate is dewatered and then at least dried to give a molded pulp product.

Screening, dewatering, and drying can be performed according to conventionally known methods concerning molded pulp.

For example, by straining the pulp-containing aqueous composition to dewater it (for example, by suction and/or pressure reduction) using a mold that has a desired shape and that is provided with numerous holes (and that may be equipped with a filter as necessary), the aqueous medium can be at least partially removed from the pulp-containing aqueous composition, and a molded pulp intermediate having a shape that corresponds to the mold can be obtained.

The process from the preparation to the dewatering of the pulp-containing aqueous composition is performed, with the water soluble polymer remaining solid. For example, after preparation, dewatering is performed at a temperature lower than the dissolution temperature of the water soluble polymer, such as a temperature at least 5° C. lower. As for screening and dewatering, the aqueous medium is removed from the pulp-containing aqueous composition through a mold (and optionally a filter), and, therefore, an excessively lowered freeness of the pulp-containing aqueous composition due to dissolution of the water soluble polymer makes it substantially impossible to perform screening and dewatering and is thus not preferable. On the other hand, with the water soluble polymer remaining solid, the freeness of the pulp-containing aqueous composition is not lowered, and screening and dewatering can be appropriately performed.

After dewatering, in the resulting molded pulp intermediate, the water soluble polymer remains in a solid state (powdery, granular, fibrous, flaky, or the like depending on the water soluble polymer used as a raw material) and, for example, when starch powder is used as a raw material, the starch powder may be dispersed in the pulp.

Drying does not need to be performed such that the water soluble polymer remains in a solid state, and can be performed at a temperature at which the remaining aqueous medium can be effectively removed (if applicable, it can be a temperature equal to or higher than the dissolution temperature of the water soluble polymer), for example, 90 to 250° C., in particular 100 to 200° C. The drying time is not limited, and can be selected such that the aqueous medium remaining in the molded pulp intermediate is substantially removed. The drying atmosphere is not limited, and may be conveniently an ambient atmosphere (air under normal pressure).

During and/or after drying, other steps that are conventionally known concerning molded pulp, for example, press molding (including heat pressing), may be performed as necessary.

During drying and/or press molding, causing the water soluble polymer to at least partially dissolve makes it possible to obtain even higher gas barrier properties. The water soluble polymer does not need to dissolve entirely, and the water soluble polymer may partially remain solid.

Thus, a molded pulp product can be produced. This molded pulp product comprises a pulp, a water- and oil-resistant agent, and a water soluble polymer that does not dissolve in an aqueous medium at 40° C. or lower, and can achieve high gas barrier properties and excellent water resistance and oil resistance. In particular, it was surprisingly found that when the molded pulp product comprises a combination of a water- and oil-resistant agent and a water soluble polymer, not only higher gas barrier properties are obtained but also water resistance and oil resistance are further increased as compared to the case where a water- and oil-resistant agent is contained without a water soluble polymer.

Meanwhile, when a molded pulp product is obtained by adding an aqueous solution in which a water soluble polymer such as starch is dissolved in advance in an aqueous medium to a pulp slurry to increase strength, a sufficient strength improving effect can be obtained even when the content of the water soluble polymer based on the pulp is low, and it is thus not required to increase the content of the water soluble polymer based on the pulp.

On the other hand, in the molded pulp product of the present disclosure, the content of the water soluble polymer is 1 to 50% by mass, based on the pulp. With such a high content of the water soluble polymer based on the pulp, it is possible to not only obtain high gas barrier properties but also further increase water resistance and oil resistance as compared to the case where the water- and oil-resistant agent is added without the water soluble polymer as described above.

In the molded pulp product, the water soluble polymer may be derived from starch powder dispersed in the aqueous medium (in the pulp-containing aqueous composition).

The proportions of the pulp, the water soluble polymer, the water- and oil-resistant agent, and optionally the cationic coagulant and/or the water-resistant agent contained in the molded pulp product can be considered substantially the same as the solid contents of these components used as raw materials (usually, the aqueous medium and, if present, other liquid media can be removed by drying and press molding, but the solids can remain without being removed or decomposed).

In the molded pulp product, the content of each component (component that can remain in the molded pulp product) based on the pulp can be suitably selected according to the physical properties desired of the molded pulp product, and, for example, can be as follows:

Water soluble polymer at 1 to 50% by mass, in particular 2 to 30% by mass

Water- and oil-resistant agent at 0.01 to 20% by mass, in particular 0.05 to 10% by mass Cationic coagulant at 0 to 20% by mass, in particular 0 to 10% by mass (if present, for example, 0.001% by mass or more)

Water-resistant agent at 0 to 20% by mass, in particular 0 to 10% by mass (if present, for example, 0.001% by mass or more)

The molded pulp product of the present disclosure may have an air permeance (air permeability) of, for example, 500 seconds or more, and in particular 1000 seconds or more. Air permeance is measured in accordance with JIS P 8117 (2009). It is understood that a greater air permeance results in higher gas barrier properties, and not only gas such as oxygen but also moisture (including water vapor) less likely permeates.

The water- and oil-resistant agent and the water soluble polymer are internally added to the molded pulp product of the present disclosure (they are added to a pulp slurry, and the molded pulp product is produced by a pulp molding method). Accordingly, after the molded pulp product is used, the entirety of the product can be crushed to bring it back to the original raw materials, and is thus suitable for recycle use. Furthermore, it is possible to utilize the intrinsic biodegradability of the pulp, the molded pulp product can extremely reduce and preferably can substantially eliminate the environmental burden. Also, with the molded pulp product, the texture of the pulp can be maintained on the product surface, and the appearance is not impaired unlike when the surface is laminated with a plastic film and becomes glossy.

The molded pulp product can be suitably used as food containers (including trays and the like) for example, storage containers for frozen food and chilled food.

Since the molded pulp product of the present disclosure has excellent water resistance and oil resistance, moisture and oil derived from food do not impregnate the molded pulp product (a container), and it is thus possible to prevent deterioration of container strength resulting from impregnation with water and oil and prevent staining of the table surface or the like facing the bottom surface of the container with moisture and oil permeated through the container. Also, the molded pulp product of the present disclosure has high gas barrier properties and unlikely allows gas and water vapor to permeate, and, thus, when accommodating hot and wet food or when heated in a microwave with food being accommodated therein, it is possible to prevent the problem that gas and water vapor derived from food permeate through the container and leak to the outside and, in particular, condense on the table surface or the like facing the bottom surface of the container. Also, the molded pulp product of the present disclosure has high gas barrier properties and unlikely allow gas and water vapor (or moisture) to permeate, and, thus, when refrigerating accommodated food, evaporation of water from food and exposure of food to oxygen can be effectively reduced, freezer burn resulting therefrom can be effectively prevented, and the flavor of food can be maintained for a long period of time.

Embodiments have been described above, but it will be understood that various changes to form and detail can be made without departing from the spirit and scope of the claims.

EXAMPLES

The molded pulp product and the manufacturing method therefor of the present disclosure will now be specifically described below by way of Examples, but the present invention is not limited to the Examples. "Parts" and "%" are "parts by mass" and "% by mass", respectively, unless specified otherwise.

The test methods used below are as follows.

[Air Permeance]

The air permeance (air resistance) at the bottom part of a molded pulp product molded into a container shape was measured in accordance with JIS P 8117 (2009) using an automatic Gurley densometer manufactured by Yasuda Seiki Company (Product No. 323-AUTO, vent hole diameter 28.6±0.1 mm). The measured value of air permeance was evaluated according to the following criteria.

Evaluation Criteria

Excellent: 1000 seconds or more
Good: 500 seconds or more
Fair: 300 seconds or more
Poor: Less than 300 seconds

[Oil Resistance and Water Resistance]

First, 100 ml of an evaluation liquid at 90° C. was poured into a molded pulp product molded into a container shape, the molded pulp product was left to stand still for 30 minutes, then the evaluation liquid was discarded, and the extent of impregnation of the molded pulp product (the container) with the evaluation liquid was visually evaluated according to the following criteria. As for the evaluation liquid, corn oil was used for oil resistance, and tap water was used for water resistance.

Evaluation Criteria

Excellent: Almost no stains on the inner surface of the bottom part of the container of the molded pulp product
Good: No stains on the outer surface of the bottom part of the container of the molded pulp product
Fair: Stains slightly recognized on the outer surface of the bottom part of the container of the molded pulp product
Poor: Evaluation liquid leaked to the outer surface of the bottom part of the container of the molded pulp product Synthesis Example 1

A 500 ml reactor equipped with a stirrer, a thermometer, a reflux condenser, a dripping funnel, a nitrogen inlet, and a heater was provided, and 100 parts by mass of a methyl ethyl ketone (MEK) solvent was added. Subsequently, while the solvent was stirred, monomers consisting of 77 parts by mass of $F(CF_2)_6CH_2CH_2OCOCH=CH_2$ (referred to as "C6FA"), 13 parts by mass of hydroxyethyl methacrylate (HEMA), 5 parts by mass of ω-hydroxy-polyoxyethylene acrylate (Blemmer RAE-200 manufactured by NOF Corporation, average polymerization degree of polyoxyethylene group: about 4.5), and 5 parts of methacrylic acid (MAA) (monomers totaling 100 parts by mass), 0.1 parts by mass of lauryl mercaptan (L-SH) as a chain transfer agent, and 0.5 parts by mass of t-butyl perpivalate as an initiator were added in this order, and the mixture was stirred in a nitrogen atmosphere at 70° C. for 12 hours for copolymerization. The resulting copolymer (fluorine-containing copolymer)-containing solution (S1) had a solid concentration of 50% by mass.

Preparation Example 1 of Water- and Oil-Resistant Agent (Anionic)

First, 6.0 parts by mass of a 10% aqueous NaOH solution as a base and 85 parts by mass of ion-exchanged water were added to 50 parts by mass of the copolymer-containing solution (S1) obtained in Synthesis Example 1. After emulsification/dispersion, the mixture was heated using an evaporator, and MEK was distilled off under reduced pressure to give a pale yellow transparent fluorine-containing copolymerized water dispersion (having a volatile organic solvent content of 1% by mass or less). Ion-exchanged water was further added to the water dispersion to give a water dispersion having a solid concentration of 20% by mass (SD1).

Synthesis Example 2

A 500 ml reactor equipped with a stirrer, a thermometer, a reflux condenser, a dripping funnel, a nitrogen inlet, and a heater was provided, and 100 parts by mass of a methyl ethyl ketone (MEK) solvent was added. Subsequently, while the solvent was stirred, 77 parts by mass of C6FA, 10 parts by mass of dimethylaminoethyl methacrylate $CH_2=C(CH_3)C(O)O-CH_2CH_2N(CH_3)_2$ (hereinafter referred to as "DM"), 13 parts by mass of N-vinylpyrrolidone (hereinafter referred to as "NVP"), and 1.4 parts by mass of t-butyl perpivalate as an initiator were added in this order, and the mixture was stirred in a nitrogen atmosphere at 70° C. for 12 hours for copolymerization. The resulting copolymer (fluorine-containing copolymer)-containing solution (S2) had a solid concentration of 50% by weight.

Preparation Example 2 of Water- and Oil-Resistant Agent (Cationic)

A water dispersion having a solid concentration of 20% by mass (SD2) was obtained in the same manner as in Preparation Example 1 of a water- and oil-resistant agent except that the copolymer-containing solution (S2) obtained in Synthesis Example 2 was used, and 75 parts of a 1% aqueous acetic acid solution was added as an acid in place of the 10% aqueous NaOH solution and ion-exchanged water.

Preparation Example of Pulp Slurry

A pulp slurry (PS) having a pulp content of 0.5% by mass was prepared by mixing 0.5 parts by mass of a pulp raw material (bagasse pulp) and 99.5 parts by mass of water. Freeness was 580 cc (Canadian Standard Freeness).

Example 1

To the pulp slurry (PS) prepared above was added cationized starch (SB GUM-POSIT 300 manufactured by SANGUAN WONGSE IND. CO., LTD.) directly in a powder state as a water soluble polymer, stirring was continued for 1 minute, then a water dispersion having a solid content of 0.9% of polydimethylamine-epichlorohydrin (Nalco 7607 manufactured by Nalco) as a cationic coagulant was added, stirring was continued for 1 minute, then the above-prepared fluorine-containing copolymer water dispersion (SD1) diluted with water to a solid content of 0.6% was added as a water- and oil-resistant agent, stirring was continued for 1 minute, and thereby a pulp-containing aqueous composition was prepared. The amount of each component added was such that the content of each component in the pulp-containing aqueous composition had a value shown in Table 1.

Note that when the water- and oil-resistant agent was added in the form of a water dispersion, and the cationic coagulant or the water-resistant agent if used was added in the form of a water dispersion or dilution, the table shows the solid content of each component in the pulp-containing aqueous composition.

The pulp-containing aqueous composition prepared above was placed in a metal tank. The lower part of the tank had a metal pulp mold that was provided with numerous suction holes, and a mesh was disposed on top. From the side opposite to the side where the mesh of the pulp mold is disposed, the pulp-containing aqueous composition was sucked and dewatered by a vacuum pump through the pulp mold and the mesh to cause the solids (for example, pulp) contained in the pulp-containing aqueous composition to be deposited on the mesh, thereby giving a molded pulp intermediate. Next, the resulting molded pulp intermediate was dried by being pressed from above and below with metal meshing die halves heated to 60 to 200° C. Thereby, a molded pulp product formed into a container shape was produced. Table 1 also shows the content of each component based on the pulp in the resulting molded pulp product.

Example 2

To the pulp slurry (PS) prepared above was added cationized starch (SB GUM-POSIT 300 manufactured by SANGUAN WONGSE IND. CO., LTD.) directly in a powder state as a water soluble polymer, stirring was continued for 1 minute, then AG-E060 manufactured by AGC Inc. diluted with water to a solid content of 0.6% was added as a water- and oil-resistant agent (a water- and oil-resistant agent containing a fluorine-containing copolymer comprising repeating units derived from C6FMA, hydroxyethyl methacrylate, diethylaminoethyl methacrylate, and oxyalkylene dimethacrylate; an aqueous dispersion having a solid content of 20%; weakly cationic), stirring was continued for 1 minute, and thereby a pulp-containing aqueous composition was prepared. The amount of each component added was such that the content of each component in the pulp-containing aqueous composition had a value shown in Table 1.

Thereafter, a molded pulp product was produced in the same manner as in Example 1 except that the pulp-containing aqueous composition prepared above was used.

Example 3

To the pulp slurry (PS) prepared above was added cationized starch (SB GUM-POSIT 300 manufactured by SANGUAN WONGSE IND. CO., LTD.) as a water soluble polymer directly in a powder state, stirring was continued for 1 minute, then an alkylketene dimeter (Hercon 80 manufactured by Solenis) diluted with water to a solid content of 1.0% was added as a water-resistant agent, stirring was continued for 1 minute, then the above-prepared fluorine-containing copolymer water dispersion (SD2) diluted with water to a solid content of 0.6% was added as a water- and oil-resistant agent, stirring was continued for 1 minute, and thereby a pulp-containing aqueous composition was prepared. The amount of each component added was such that the content of each component in the pulp-containing aqueous composition had a value shown in Table 1.

Thereafter, a molded pulp product was produced in the same manner as in Example 1 except that the pulp-containing aqueous composition prepared above was used.

Example 4

A pulp-containing aqueous composition was prepared in the same manner as in Example 3 except that the above-prepared fluorine-containing copolymer water dispersion (SD1) was added as a water- and oil-resistant agent. (The amount of each component added was such that the content of each component in the pulp-containing aqueous composition had a value shown in Table 1. The same applies to the following Examples.)

Thereafter, a molded pulp product was produced in the same manner as in Example 1 except that the pulp-containing aqueous composition prepared above was used.

Examples 5 to 8

Pulp-containing aqueous compositions were prepared in the same manner as in Example 4 except that the content of the water soluble polymer in the pulp-containing aqueous compositions was different.

Thereafter, molded pulp products were produced in the same manner as in Example 1 except that the pulp-containing aqueous compositions prepared above were used.

Example 9

A pulp-containing aqueous composition was prepared in the same manner as in Example 4 except that a styrene-containing polymer (WSF-1 manufactured by Guangxi E&K Environmental Protection Science And Technology Co., Ltd., a styrene-(meth)acrylate copolymer) diluted with water to a solid content of 1.0% was added as a water-resistant agent.

Thereafter, a molded pulp product was produced in the same manner as in Example 1 except that the pulp-containing aqueous composition prepared above was used.

Example 10

A pulp-containing aqueous composition was prepared in the same manner as in Example 4 except that amphoteric starch (CHARGEMASTER R520 manufactured by Grain Processing Corporation) was added directly in a powder state as a water soluble polymer.

Thereafter, a molded pulp product was produced in the same manner as in Example 1 except that the pulp-containing aqueous composition prepared above was used.

Comparative Example 1

Cationized starch (SB GUM-POSIT 300 manufactured by SANGUAN WONGSE IND. CO., LTD) was added directly in a powder state as a water soluble polymer to the pulp slurry (PS) prepared above, stirring was continued for 1 minute, and thereby a pulp-containing aqueous composition was prepared. (The amount of each component added was such that the content of each component in the pulp-containing aqueous composition had a value shown in Table 2. The same applies to the following Comparative Examples.)

Thereafter, a molded pulp product was produced in the same manner as in Example 1 except that the pulp-containing aqueous composition prepared above was used.

Comparative Example 2

To the pulp slurry (PS) prepared above was added a water dispersion having a solid content of 0.9% of polydimethyl-amine-epichlorohydrin (Nalco 7607 manufactured by Nalco) as a cationic coagulant, stirring was continued for 1 minute, then the above-prepared fluorine-containing copolymer water dispersion (SD1) diluted with water to a solid content of 0.6% was added as a water- and oil-resistant agent, stirring was continued for 1 minute, and thereby a pulp-containing aqueous composition was prepared.

Thereafter, a molded pulp product was produced in the same manner as in Example 1 except that the pulp-containing aqueous composition prepared above was used.

Comparative Example 3

To the pulp slurry (PS) prepared above was added AG-E060 manufactured by AGC Inc. diluted with water to a solid content of 0.6% as a water- and oil-resistant agent (a water- and oil-resistant agent containing a fluorine-containing copolymer comprising repeating units derived from C6FMA, hydroxyethyl methacrylate, diethylaminoethyl methacrylate, and oxyalkylene dimethacrylate; an aqueous dispersion having a solid content of 20%; weakly cationic), stirring was continued for 1 minute, and thereby a pulp-containing aqueous composition was prepared.

Thereafter, a molded pulp product was produced in the same manner as in Example 1 except that the pulp-containing aqueous composition prepared above was used.

Comparative Example 4

To the pulp slurry (PS) prepared above was added an alkylketene dimeter (Hercon 80 manufactured by Solenis) diluted with water to a solid content of 1.0% as a water-resistant agent, stirring was continued for 1 minute, then the above-prepared fluorine-containing copolymer water dispersion (SD2) diluted with water to a solid content of 0.6% was added as a water- and oil-resistant agent, stirring was continued for 1 minute, and thereby a pulp-containing aqueous composition was prepared.

Thereafter, a molded pulp product was produced in the same manner as in Example 1 except that the pulp-containing aqueous composition prepared above was used.

Comparative Example 5

To the pulp slurry (PS) prepared above was added an alkylketene dimeter (Hercon 80 manufactured by Solenis) diluted with water to a solid content of 1.0% as a water-resistant agent, stirring was continued for 1 minute, then the above-prepared fluorine-containing copolymer water dispersion (SD1) diluted with water to a solid content of 0.6% was added as a water- and oil-resistant agent, stirring was continued for 1 minute, and thereby a pulp-containing aqueous composition was prepared.

Thereafter, a molded pulp product was produced in the same manner as in Example 1 except that the pulp-containing aqueous composition prepared above was used.

Comparative Example 6

To the pulp slurry (PS) prepared above was added cationized starch (SB GUM-POSIT 300 manufactured by SANGUAN WONGSE IND. CO., LTD.) directly in a powder state as a water soluble polymer, stirring was continued for 1 minute, then an alkylketene dimeter (Hercon 80 manufactured by Solenis) diluted with water to a solid content of 1.0% was added as a water-resistant agent, and thereby a pulp-containing aqueous composition was prepared.

Thereafter, a molded pulp product was produced in the same manner as in Example 1 except that the pulp-containing aqueous composition prepared above was used.

Comparative Example 7

To the pulp slurry (PS) prepared above was added a styrene-containing polymer (WSF-1 manufactured by Guangxi E&K Environmental Protection Science And Technology Co., Ltd., a styrene-(meth)acrylate copolymer) diluted with water to a solid content of 1.0% as a water-resistant agent, stirring was continued for 1 minute, then the above-prepared fluorine-containing copolymer water dispersion (SD1) diluted with water to a solid content of 0.6% was added as a water- and oil-resistant agent, stirring was continued for 1 minute, and thereby a pulp-containing aqueous composition was prepared.

Thereafter, a molded pulp product was produced in the same manner as in Example 1 except that the pulp-containing aqueous composition prepared above was used.

The air permeance, oil resistance, and water resistance of the molded pulp products (containers) produced in Examples 1 to 10 and Comparative Examples 1 to 7 were evaluated. The results are also shown in Tables 1 and 2.

TABLE 1

| | | | Ex. 1 | Ex. 2 | Ex. 3 | Ex. 4 | Ex. 5 |
|---|---|---|---|---|---|---|---|
| Pulp-containing aqueous composition (based on total mass) | Water | | 99.4480% | 99.4480% | 99.4479% | 99.4477% | 99.4827% |
| | Pulp | | 0.5% | 0.5% | 0.5% | 0.5% | 0.5% |
| | Water-soluble polymer | Cationized Amphoteric | 0.050% | 0.050% | 0.050% | 0.050% | 0.015% |
| | Cationic coagulant | | 0.001% | | | | |
| | Water-resistant agent | Alkylketene dimer | | | 0.0015% | 0.0015% | 0.0015% |
| | | Styrene-containing polymer | | | | | |
| | Water- and oil-resistant agent | SD1 (anionic) | 0.0010% | | | 0.0008% | 0.0008% |
| | | SD2 (cationic) | | | 0.0006% | | |
| | | AG-E060 (cationic) | | 0.0020% | | | |
| Molded pulp product (based on mass of pulp) | Water-soluble polymer | Cationized Amphoteric | 10.0% | 10.0% | 10.0% | 10.0% | 3.0% |
| | Cationic coagulant | | 0.20% | | | | |
| | Water-resistant agent | Alkylketene dimer | | | 0.30% | 0.30% | 0.30% |
| | | Styrene-containing polymer | | | | | |
| | Water- and oil-resistant agent | SD1 (anionic) | 0.20% | | | 0.16% | 0.16% |
| | | SD2 (cationic) | | | 0.12% | | |
| | | AG-E060 (cationic) | | 0.40% | | | |
| Evaluation | Air permeance | Evaluation | Excellent | Excellent | Excellent | Excellent | Good |
| | | Measured value (second) | 1,124 | 1,182 | 1,279 | 1,440 | 517 |
| | Oil resistance | | Good | Excellent | Good | Excellent | Good |
| | Water resistance | | Good | Good | Good | Excellent | Excellent |

| | | | Ex. 6 | Ex. 7 | Ex. 8 | Ex. 9 | Ex. 10 |
|---|---|---|---|---|---|---|---|
| Pulp-containing aqueous composition (based on total mass) | Water | | 99.4727% | 99.4227% | 99.3977% | 99.4457% | 99.4477% |
| | Pulp | | 0.5% | 0.5% | 0.5% | 0.5% | 0.5% |
| | Water-soluble polymer | Cationized Amphoteric | 0.025% | 0.075% | 0.100% | 0.050% | 0.050% |
| | Cationic coagulant | | | | | | |
| | Water-resistant agent | Alkylketene dimer | 0.0015% | 0.0015% | 0.0015% | | 0.0015% |
| | | Styrene-containing polymer | | | | 0.0035% | |
| | Water- and oil-resistant agent | SD1 (anionic) | 0.0008% | 0.0008% | 0.0008% | 0.0008% | 0.0008% |
| | | SD2 (cationic) | | | | | |
| | | AG-E060 (cationic) | | | | | |
| Molded pulp product (based on mass of pulp) | Water-soluble polymer | Cationized Amphoteric | 5.0% | 15.0% | 20.0% | 10.0% | 10.0% |
| | Cationic coagulant | | | | | | |
| | Water-resistant agent | Alkylketene dimer | 0.30% | 0.30% | 0.30% | | 0.30% |
| | | Styrene-containing polymer | | | | 0.70% | |
| | Water- and oil-resistant agent | SD1 (anionic) | 0.16% | 0.16% | 0.16% | 0.16% | 0.16% |
| | | SD2 (cationic) | | | | | |
| | | AG-E060 (cationic) | | | | | |

TABLE 1-continued

| Evaluation | Air permeance | Evaluation | Good | Excellent | Excellent | Excellent | Good |
|---|---|---|---|---|---|---|---|
| | | Measured value (second) | 563 | 1,537 | 1,794 | 1,384 | 911 |
| | Oil resistance | | Good | Excellent | Excellent | Good | Good |
| | Water resistance | | Excellent | Excellent | Excellent | Good | Excellent |

TABLE 2

| | | | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|---|
| Pulp-containing aqueous composition (based on total mass) | Water | | 99.4500% | 99.4980% | 99.4980% | 99.4979% | 99.4977% | 99.4485% | 99.4957% |
| | Pulp | | 0.5% | 0.5% | 0.5% | 0.5% | 0.5% | 0.5% | 0.5% |
| | Water-soluble polymer | Cationized Amphoteric | 0.050% | | | | | 0.050% | |
| | Cationic coagulant | | | 0.001% | | | | | |
| | Water-resistant agent | Alkylketene dimer | | | | | 0.0015% | 0.0015% | 0.0015% | |
| | | Styrene-containing polymer | | | | | | | 0.0035% |
| | Water- and oil-resistant agent | SD1 (anionic) | | 0.0010% | | | | 0.0008% | |
| | | SD2 (cationic) | | | | | 0.0006% | | 0.0008% |
| | | AG-E060 (cationic) | | | | 0.0020% | | | |
| Molded pulp product (based on mass of pulp) | Water-soluble polymer | Cationized Amphoteric | 10.0% | | | | | 10.0% | |
| | Cationic coagulant | | | 0.20% | | | | | |
| | Water-resistant agent | Alkylketene dimer | | | | | 0.30% | 0.30% | 0.30% | |
| | | Styrene-containing polymer | | | | | | | 0.70% |
| | Water- and oil-resistant agent | SD1 (anionic) | | 0.20% | | | | 0.16% | |
| | | SD2 (cationic) | | | | | 0.12% | | 0.16% |
| | | AG-E060 (cationic) | | | | 0.40% | | | |
| Evaluation | Air permeance | Evaluation | Excellent | Poor | Poor | Poor | Poor | Excellent | Poor |
| | | Measured value (second) | 1,673 | 247 | 221 | 198 | 207 | 1,608 | 213 |
| | Oil resistance | | Poor | Fair | Good | Fair | Fair | Poor | Poor |
| | Water resistance | | Poor | Good | Poor | Good | Good | Good | Good |

As can be understood from Tables 1 to 2, while the molded pulp products of Examples 1 to 10 had high gas barrier properties (air permeance) and excellent water resistance and oil resistance, the molded pulp products of Comparative Examples 1 to 7 were insufficient with respect to at least any one of gas barrier properties (air permeance), water resistance, and oil resistance. In particular, it was verified that the molded pulp products of Examples 1 to 4 and 9 containing a water- and oil-resistant agent and a water soluble polymer in combination had not only higher gas barrier properties (air permeance) but also even more increased water resistance and oil resistance than any of Comparative Examples 2 to 5 and 7 containing a water- and oil-resistant agent without a water soluble polymer.

Moreover, the FIGURE shows a scanning electron micrograph (SEM) of the molded pulp product of Example 1 (in the FIGURE, arrows indicate a water soluble polymer having a powdery form (particles of a water soluble polymer)). As can be understood from the FIGURE, it was verified that the water soluble polymer (cationized starch in this Example) having a powdery form was present between pulp fibers and/or on the surface of pulp fibers. Accordingly, it is understood that at least a part of the solid water soluble polymer (having a powdery form in this Example) used as a raw material generally retains its original form (a powdery form in the Examples) and/or has a shape derived from its original form, in the molded pulp product.

INDUSTRIAL APPLICABILITY

The molded pulp product of the present disclosure is usable in, but is not limited to, applications where gas barrier properties, water resistance, and oil resistance are required, e.g., as a food container.

The present application claims priority to Japanese Patent Application No. 2017-253440 filed in Japan on Dec. 28, 2017, the entire content of which is incorporated herein by reference.

The invention claimed is:
1. A molded pulp product comprising:
a pulp,
a water- and oil-resistant agent, and
a water soluble polymer that does not dissolve in an aqueous medium at 40° C. or lower,
wherein the water- and oil-resistant agent comprises a fluorine-containing copolymer comprising repeating units derived from:
(a) a fluorine-containing monomer represented by general formula:

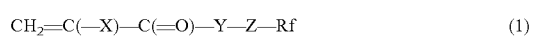

wherein
- X is a hydrogen atom, a monovalent organic group, or a halogen atom,
- Y is —O— or —NH—,
- Z is a direct bond or a divalent organic group, and
- Rf is a fluoroalkyl group having 1 to 6 carbon atoms; and (b) a monomer having at least one of an anion donating group and a cation donating group; and wherein the water soluble polymer comprises starch having a cation site, and wherein a content of the water soluble polymer is 1 to 50% by mass, based on the pulp.

2. The molded pulp product according to claim 1, wherein the water soluble polymer comprises a starch powder.

3. The molded pulp product according to claim 1, wherein a content of the water- and oil-resistant agent is 0.01 to 20% by mass, based on the pulp.

4. The molded pulp product according to claim 1, wherein in general formula (1),
- X is a hydrogen atom, a linear or branched alkyl group having 1 to 21 carbon atoms, a fluorine atom, a chlorine atom, a bromine atom, an iodine atom, a $CFX^1X^2$ group (wherein $X^1$ and $X^2$ are each independently a hydrogen atom, a fluorine atom, a chlorine atom, a bromine atom, or an iodine atom), a cyano group, a linear or branched fluoroalkyl group having 1 to 21 carbon atoms, a substituted or unsubstituted benzyl group, or a substituted or unsubstituted phenyl group,
- Z is a direct bond, an aliphatic group having 1 to 10 carbon atoms, an aromatic group or cycloaliphatic group having 6 to 18 carbon atoms, a —$CH_2CH_2N(R^1)SO_2$— group (wherein $R^1$ is an alkyl group having 1 to 4 carbon atoms), a —$CH_2CH(OZ^1)CH_2$— group (wherein $Z^1$ is a hydrogen atom or an acetyl group), or a —$(CH_2)_m$—$SO_2$—$(CH_2)_n$— group or —$(CH_2)_m$—S—$(CH_2)_n$— group (wherein m is 1 to 10, and n is 0 to 10), and
- Rf is a fluoroalkyl group having 1 to 6 carbon atoms.

5. The molded pulp product according to claim 1, further comprising a cationic coagulant.

6. The molded pulp product according to claim 1, further comprising a water-resistant agent in addition to the water- and oil-resistant agent.

7. The molded pulp product according to claim 1, having an air permeance of 500 seconds or more.

8. The molded pulp product according to claim 1, which is a food container.

9. The molded pulp product according to claim 1, wherein Rf is a perfluoroalkyl group having 1 to 6 carbon atoms.

\* \* \* \* \*